(12) United States Patent
Seki

(10) Patent No.: US 7,857,334 B2
(45) Date of Patent: Dec. 28, 2010

(54) SUSPENSION ARM SUPPORTING STRUCTURE

(75) Inventor: Bunzo Seki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 12/055,060

(22) Filed: Mar. 25, 2008

(65) Prior Publication Data

US 2008/0238014 A1 Oct. 2, 2008

(51) Int. Cl.
*B60G 3/04* (2006.01)
*F16C 19/34* (2006.01)

(52) U.S. Cl. .................... 280/124.134; 384/127

(58) Field of Classification Search .......... 280/124.134, 280/124.135, 124.15; 384/44, 48, 145, 396, 384/126, 127, 420
See application file for complete search history.

(56) References Cited

U.S. PATENT DOCUMENTS

| | | | |
|---|---|---|---|
| 4,786,074 A | 11/1988 | Muramatsu | |
| 5,016,903 A | 5/1991 | Kijima et al. | |
| 5,242,228 A * | 9/1993 | Hattori | 384/145 |
| 5,322,317 A * | 6/1994 | Kusaka et al. | 280/124.134 |
| 5,993,065 A * | 11/1999 | Ladzinski et al. | 384/49 |
| 6,186,668 B1 * | 2/2001 | Beaman | 384/486 |
| 6,746,032 B2 * | 6/2004 | Seki | 280/124.135 |
| 7,063,342 B2 * | 6/2006 | Seki | 280/124.134 |
| 2004/0169347 A1 * | 9/2004 | Seki | 280/124.134 |
| 2004/0207190 A1 | 10/2004 | Nakagawa et al. | |
| 2006/0220341 A1 * | 10/2006 | Seki et al. | 280/276 |
| 2007/0018419 A1 * | 1/2007 | Kinouchi et al. | 280/124.134 |

FOREIGN PATENT DOCUMENTS

| | | |
|---|---|---|
| FR | 2673560 | 9/1992 |
| GB | 1223471 | 2/1971 |
| GB | 1477525 | 6/1977 |
| JP | 2004-276651 | 10/2004 |

OTHER PUBLICATIONS

Office Action issued by the Australian Patent office on Nov. 17, 2009.

* cited by examiner

*Primary Examiner*—Paul N Dickson
*Assistant Examiner*—Joseph Rocca
(74) *Attorney, Agent, or Firm*—Ditthavong Mori & Steiner, P.C.

(57) ABSTRACT

A suspension arm supporting structure supported by a frame-side supporting portion of a vehicle body frame includes a suspension arm. The suspension arm includes first and second arm-side supporting portions and an arm portion which are integrally formed. The first arm-side supporting portion is supported by the frame-side supporting portion in a radial direction and in an axial direction. The second arm-side supporting portion is supported by the frame-side supporting portion only in the radial direction.

10 Claims, 5 Drawing Sheets

SUSPENSION ARM SUPPORTING STRUCTURE

CROSS-REFERENCE TO RELATED APPLICATIONS

The present application claims priority under 35 U.S.C. §119 to Japanese Patent Application No. 2007-092804, filed Mar. 30, 2007, entitled "Suspension Arm Supporting Structure." The contents of this application are incorporated herein by reference in their entirety.

BACKGROUND OF THE INVENTION

1. Field of the Invention

The present invention relates to a suspension arm supporting structure.

2. Discussion of the Background

JP-A-2004-276651 discloses a suspension arm supporting structure having a spherical slide bearing as a supporting portion for supporting a suspension arm. The contents of this publication are incorporated herein by reference in their entirety.

Referring to FIG. 5 and FIG. 7 in JP-A-2004-276651, a front frame 58 which constitutes a part of a vehicle body frame is provided with lower arm mounting portions 82, 83 for mounting a lower arm 81 on a lower horizontal portion 69 thereof, and fitting portions 96, 97 provided respectively on arm portions 92, 93 of the lower arm 81 are attached to the lower arm mounting portions 82, 83 with screw bolts 108, 118, respectively.

A bearing 104 and a bearing 114 are provided between the screw bolt 108 and the fitting portion 96 and between the screw bolt 118 and the fitting portion 97 respectively, and these bearings 104, 114 support the fitting portions 96, 97 respectively in the radial direction and the axial direction.

The both fitting portions 96, 97 are supported by the bearings 104, 114 in the radial direction and the axial direction. Therefore, for example, when significant manufacturing errors exist in angle between the arm portion 92 and the arm portion 93 or the distance between the fitting portion 96 and the fitting portion 97, these members might not be attached easily because the other fitting portion 97 might not be positioned at a predetermined position with respect to the other lower arm mounting portion 83 when the fitting portion 96 is attached to the lower arm mounting portion 82.

SUMMARY OF THE INVENTION

According to one aspect of the present invention, a suspension arm supporting structure supported by a frame-side supporting portion of a vehicle body frame includes a suspension arm. The suspension arm includes first and second arm-side supporting portions and an arm portion which are integrally formed. The first arm-side supporting portion is supported by the frame-side supporting portion in a radial direction and in an axial direction. The second arm-side supporting portion is supported by the frame-side supporting portion only in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
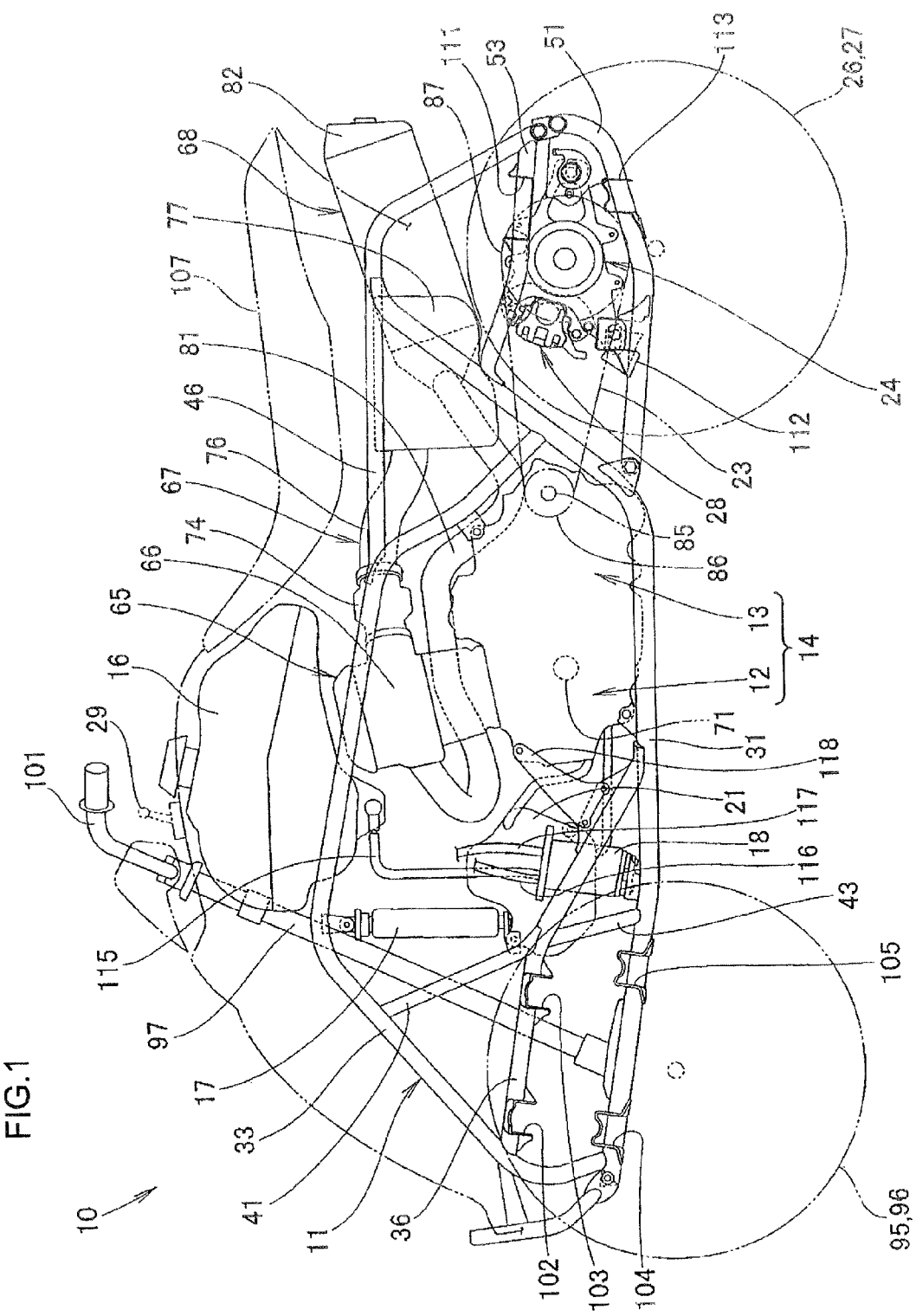
FIG. 1 is a side view of a vehicle in which a suspension arm supporting structure according to an embodiment of the present invention is employed.

The embodiments will now be described with reference to the accompanying drawings, wherein like reference numerals designate corresponding or identical elements throughout the various drawings.

FIG. 1 is a side view of a vehicle in which a suspension arm supporting structure according to an embodiment of the present invention is employed. A vehicle 10 is a rough-terrain traveling four-wheel vehicle including a power unit 14 composed of an engine 12 and a transmission 13 provided integrally with the engine 12 and attached to the center of a vehicle body frame 11 as a framework, a fuel tank 16 arranged above the power unit 14, a fuel pump 18 for supplying fuel in the fuel tank 16 to the engine 12, an oil tank 21 for storing lubrication oil used in the power unit 14, the fuel pump 18 and the oil tank 21 being arranged in a space below the fuel tank 16 and between a radiator 17 and the power unit 14, a speed reducer 24 arranged rearwardly of the power unit 14 for being transmitted with a power via a chain 23, and a disk brake device 28 provided on the speed reducer 24 for putting brake on left and right rear wheels 26, 27.

The vehicle body frame 11 includes a pair of left and right lower main frames 31, 32 (only the reference numeral 31 on the near side is shown) extending through the lower portion of the vehicle body in the fore-and-aft direction for supporting the power unit 14, a pair of left and right upper main frames 33, 34 (only the reference numeral 33 on the near side is shown) attached to the front ends and rear portions of the lower main frames 31, 32, a pair of left and right side frames 36, 37 (only the reference numeral 36 on the near side is shown) extending from the front portions of the upper main frames 33, 34 to midsections of the lower main frames 31, 32, upper reinforcing frames 41, 42 (only the reference numeral 41 on the near side is shown) for connecting the side frames 36, 37 and the upper main frames 33, 34 respectively, lower reinforcing frames 43, 44 (only the reference numeral 43 on the near side is shown) for connecting the side frames 36, 37 and the lower main frames 31, 32, respectively, rear upper frames 46, 47 (only the reference numeral 46 on the near side is shown) attached to rear upper portions of the upper main frames 33, 34 and the rear ends of the lower main frames 31, 32, respectively, rear lower frames 51, 52 (only the reference numeral 51 on the near side is shown) for connecting the rear ends of the rear upper frames 46, 47 and the rear lower portions of the lower main frames 31, 32, respectively, and rear sub frames 53, 54 (only the reference numeral 53 on the near side is shown) attached to the rear portions of the lower main frames 31, 32 and the rear ends of the rear upper frames 46, 47 respectively.

The engine 12 includes a cylinder head 66 on a cylinder portion 65 protruded upward, and an intake device 67 and an exhaust device 68 are attached to the cylinder head 66. Reference numeral 71 designates a crankshaft provided on the engine 12.

The intake device 67 includes a throttle body 74 attached to the rear portion of the cylinder head 66, and an air cleaner 77 connected to the throttle body 74 via a connecting tube 76.

The exhaust device 68 includes an exhaust pipe 81 attached at one end to the cylinder head 66 and a muffler 82 connected to the other end of the exhaust pipe 81.

The transmission 13 includes an output shaft 85 projecting from the side portion of the rear portion thereof, and a drive sprocket 86 attached to the output shaft 85. The chain 23 is wound around the drive sprocket 86 and a driven sprocket 87 provided on the side of the speed reducer 24.

Reference numerals 95, 96 in the drawing designate a pair of left and right front wheels, reference numeral 97 designates a steering shaft rotatably attached to the vehicle body frame 11 for steering the front wheels 95, 96, reference numeral 101 designates a bar handle attached to the upper end of the steering shaft 97, reference numerals 102 to 105 designate front suspension arm brackets attached to the vehicle body frame 11 for attaching suspension arms for the front wheels 95, 96 in left and right pairs respectively, reference numeral 107 designates a seat, reference numerals 111 to 113 designate rear suspension arm brackets attached to the vehicle body frame 11 for attaching suspension arms (described later in detail) for rear wheels 26, 27, reference numerals 115 to 117 designate fuel hoses (a fuel supply tube 115 from the fuel tank 16 to the fuel pump 18, a fuel supply tube 116 from the fuel pump 18 to an injector, not shown, attached to the throttle body 74, and a return tube 117 from the fuel pump 18 to the fuel tank 16), and reference numeral 118 designates an engine hanger for supporting the front portion of the power unit 14.

Figure 2:
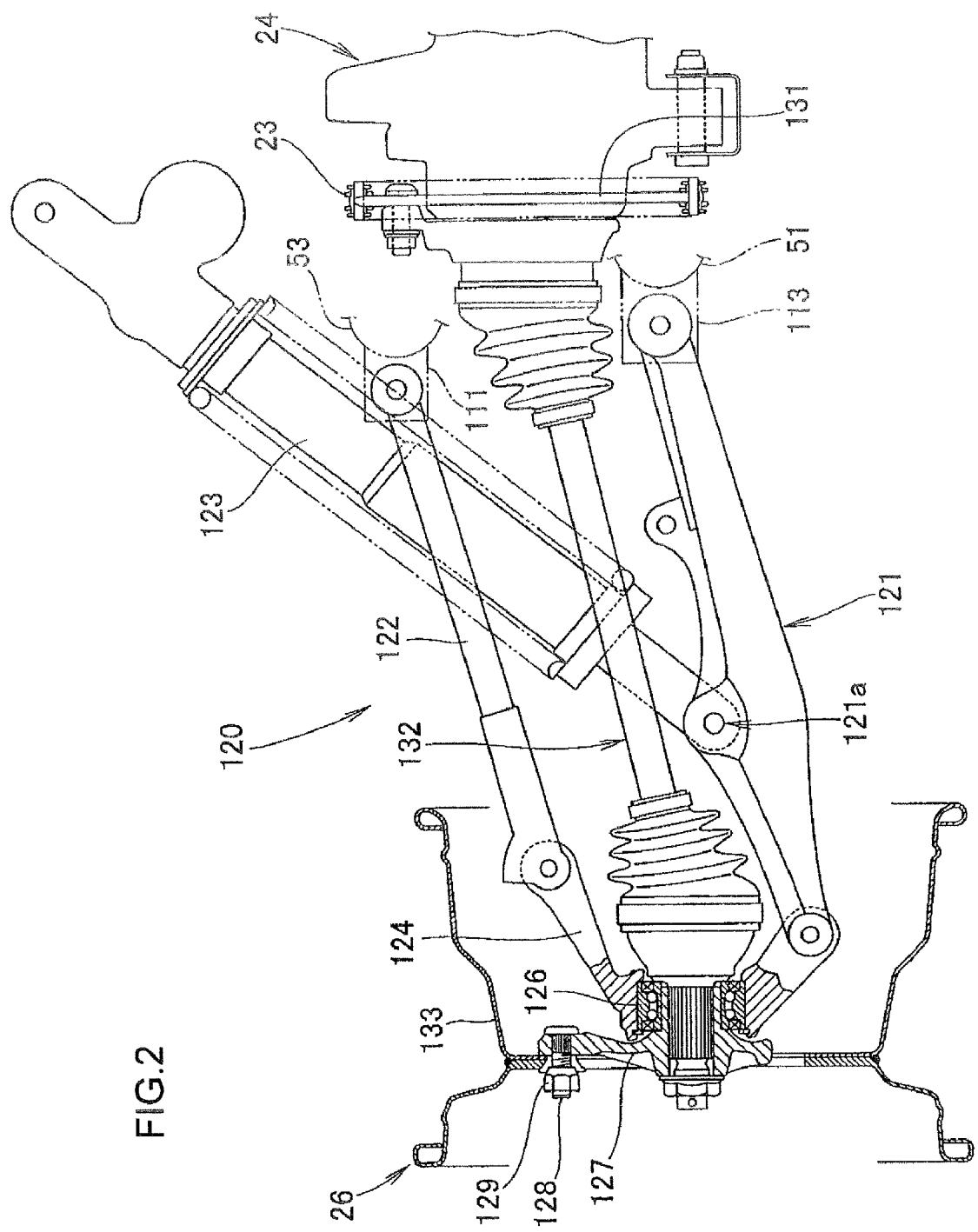
FIG. 2 is a back view of a suspension for a rear wheel according to the embodiment of the present invention.

FIG. 2 is a back view showing a suspension for rear wheel according to the embodiment of the present invention. A suspension for rear wheels 120 includes a lower arm 121 as a suspension arm formed of aluminum alloy attached to the rear lower frame 51 which constitutes the vehicle body frame via the rear suspension arm brackets 112, 113 (only the reference numeral 113 on one side is shown) as frame-side supporting portions so as to be capable of swinging in the vertical direction, an upper arm 122 attached to the rear sub frame 53 which constitutes the vehicle body frame via the rear suspension arm bracket 111 so as to be capable of swinging in the vertical direction, a rear cushion unit 123 connected at the upper end thereof to the upper portion of the vehicle body frame and at the lower end thereof to a midsection connecting portion 121*a* of the lower arm 121 so as to be capable of swinging, a knuckle 124 connected to the distal end portions of the lower arm 121 and the upper arm 122 respectively so as to be capable of swinging in the vertical direction, and a hub 127 rotatably attached to the knuckle 124 via a bearing 126. The rear wheel 26 is attached to the hub 127 with a plurality of screw bolts 128 and nuts 129.

Here, reference numeral 131 designates a driven sprocket provided on the speed reducer 24 and wound by the chain 23, reference numeral 132 designates a drive shaft provided between an output shaft of the speed reducer 24 and the hub 127 for transmitting power from the speed reducer 24 to the hub 127, and reference numeral 133 designates a wheel which constitutes the rear wheel 26.

Figure 3:
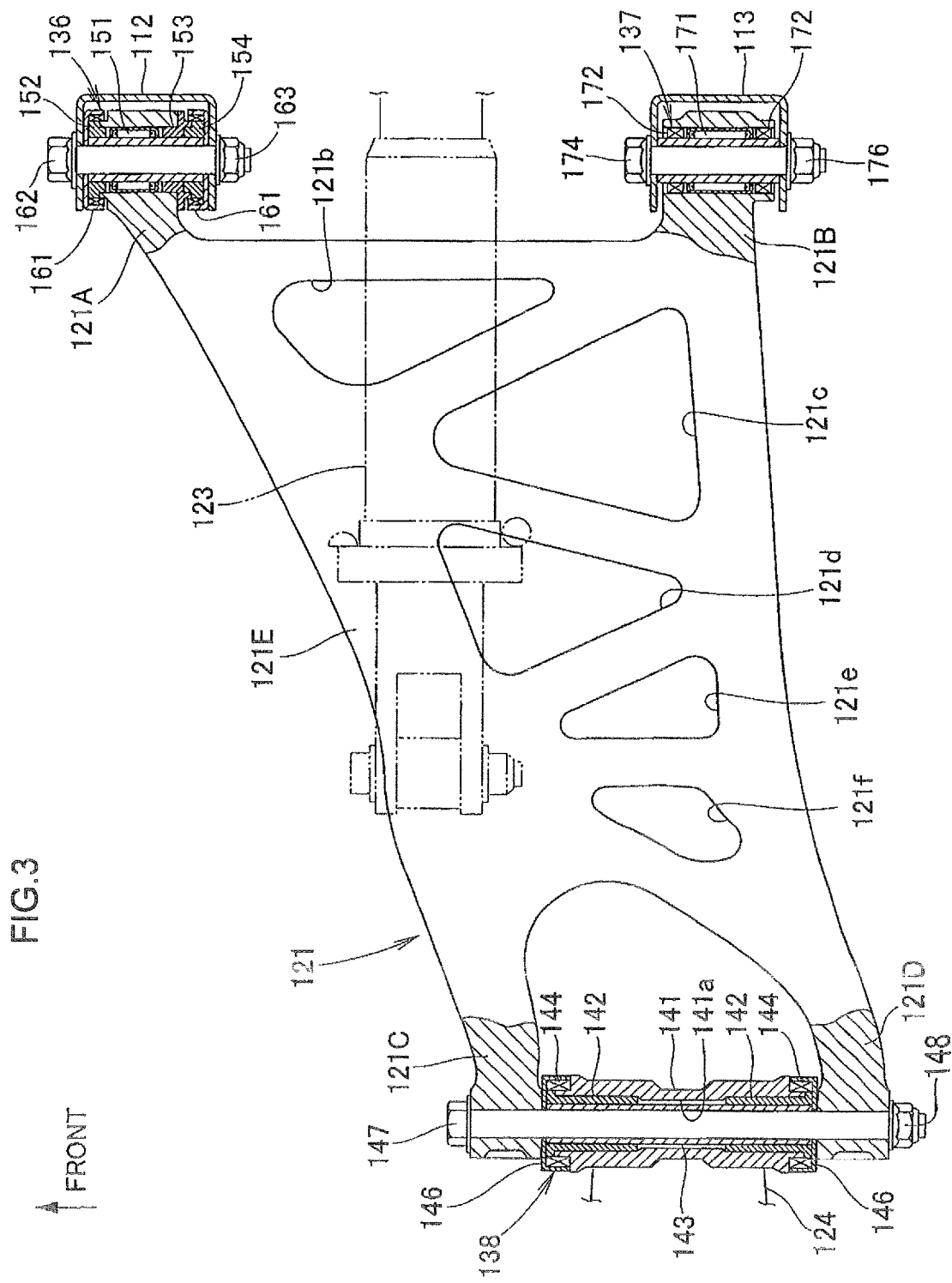
FIG. 3 is an explanatory drawing showing a lower arm and a supporting structure of the end portion thereof according to the embodiment of the present invention.

FIG. 3 is an explanatory drawing illustrating a supporting structure of the lower arm and the end portion thereof according to the embodiment of the present invention (an arrow in the drawing FRONT designates the front of the vehicle, hereinafter). The lower arm 121 is a forged aluminum alloy or die-cast aluminum alloy, and includes an inner front arm portion 121A as a first arm-side supporting portion provided on the front portion on the inner side of the vehicle body, an inner rear arm portion 121B as a second arm-side supporting portion provided on the rear portion on the inner side of the vehicle body, an outer front arm portion 121C provided on the front portion of the outer side of the vehicle body, and an outer rear arm portion 121D provided on the rear portion on the outer side of the vehicle body formed integrally with an arm body 121E as the arm portion.

The inner front arm portion 121A is supported by the rear suspension arm bracket 112 via an inner front portion supporting member 136, the inner rear arm portion 121B is supported by the rear suspension arm bracket 113 via an inner rear portion supporting member 137, and the outer front arm portion 121C and the outer rear arm portion 121D support the knuckle 124 via an outside supporting member 138. The inner front portion supporting member 136 and the inner rear portion supporting member 137 will be described in conjunction with FIG. 4 and FIG. 5. Reference numerals 121*b* to 121*f* designate holes for reducing weight.

The outside supporting member 138 includes flanged bushes 142, 142 inserted to the both ends of a hollow portion 141*a* of a cylindrical portion 141 provided on the knuckle 124, a cylindrical collar 143 inserted into the flanged bushes 142, 142, seal members 144, 144 fitted to the flanged bushes 142, 142 radially outside thereof and to the both end portions of the cylindrical portion 141, cup-shaped end cover members 146, 146 fitted respectively on the seal members 144, 144, a screw bolt 147 passing through the outer front arm portion 121C, the end cover member 146, the collar 143, the end cover member 146 and the outer rear arm portion 121D in sequence and a nut 148 screwed onto the distal end of the screw bolt 147.

Figure 4:
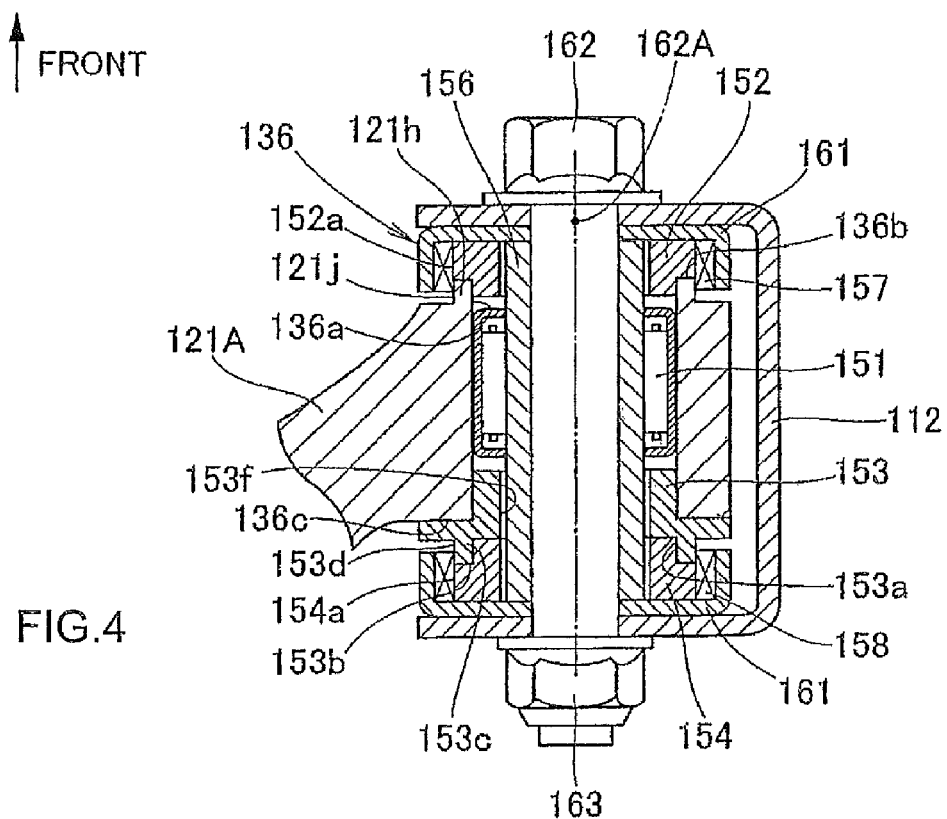
FIG. 4 is a first cross-sectional view showing the suspension arm supporting structure according to the embodiment of the present invention.

FIG. 4 is a first cross-sectional view showing a suspension arm supporting structure according to the embodiment of the present invention, illustrating the inner front portion supporting member 136.

The inner front portion supporting member 136 includes a needle bearing 151 inserted into a through hole 136*a* formed on the inner front arm portion 121A in the fore-and-aft direction, a front bush 152 fitted to the front end portion of the through hole 136*a* and abutted on a front end surface 136*b*, a bush receiving member 153 press-fitted into the rear end portion of the through hole 136*a* and abutted to a rear end surface 136*c*, a rear bush 154 fitted to a large-diameter hole 153*a* of the bush receiving member 153 and abutted to an end surface 153*b* of the bush receiving member 153, a cylindrical collar 156 inserted respectively into the front bush 152, the needle bearing 151, the bush receiving member 153 and the rear bush 154, a seal member 157 fitted across an outer peripheral surface 152*a* of the front bush 152 and an outer peripheral surface 121*j* of a cylindrical portion 121*h* formed integrally with the front end portion of the inner front arm portion 121A, a seal member 158 fitted across an outer peripheral surface 154*a* of the rear bush 154 and an outer peripheral surface 153*d* of a cylindrical portion 153*c* formed integrally with the rear end portion of the bush receiving member 153, cup-shaped end cover members 161, 161 fitted respectively on the seal members 157, 158, a screw bolt 162 passing through the rear suspension arm bracket 112, the end cover member 161, the collar 156, the end cover member 161 and the rear suspension arm bracket 112 in sequence and a nut 163 screwed onto the distal end of the screw bolt 162.

In the configuration as described above, the inner front arm portion 121A is supported by the needle bearing 151 of the inner front portion supporting member 136 in the direction of radius (radial direction) of the needle bearing 151 with respect to the rear suspension arm bracket 112, and is supported by the front bush 152 and the rear bush 154 of the inner front portion supporting member 136 in the direction in which an axial line 162A of the screw bolt 162 extends, that is, in the axial direction of the screw bolt 162.

The bush receiving member 153 has the inner diameter of a hollow hole 153*f* thereof larger than the outer diameter of the collar 156, and does not slide with respect to the collar 156 because there is a gap between itself and the collar 156.

In this manner, the reason why the bush receiving member 153 is provided is because a tool for machining the rear end surface 136*c* cannot be entered on a line which connects the inner front arm portion 121A and the inner rear arm portion 121B as shown in FIG. 3 even when an attempt is made to form the rear end surface 136*c* of the inner front arm portion 121A by machining as in the case of forming the front end surface 136*b* of the inner front arm portion 121A by machining.

Alternatively, the end surface for receiving the rear bush 154 in the axial direction is formed on the bush receiving member 153, which is a separate member from the inner front arm portion 121A, as the end surface 153*b* by machining.

Also, even though an attempt is made to form a cylindrical portion on the rear end portion of the inner front arm portion 121A by machining as in the case of forming the cylindrical portion 121*h* on the front end portion of the inner front arm portion 121A for fitting the seal member 157 by machining, it cannot be formed from the reason described above. Therefore, the cylindrical portion 153*c* for fitting the seal member 158 is formed on the rear end portion of the bush receiving member 153 by machining.

Figure 5:
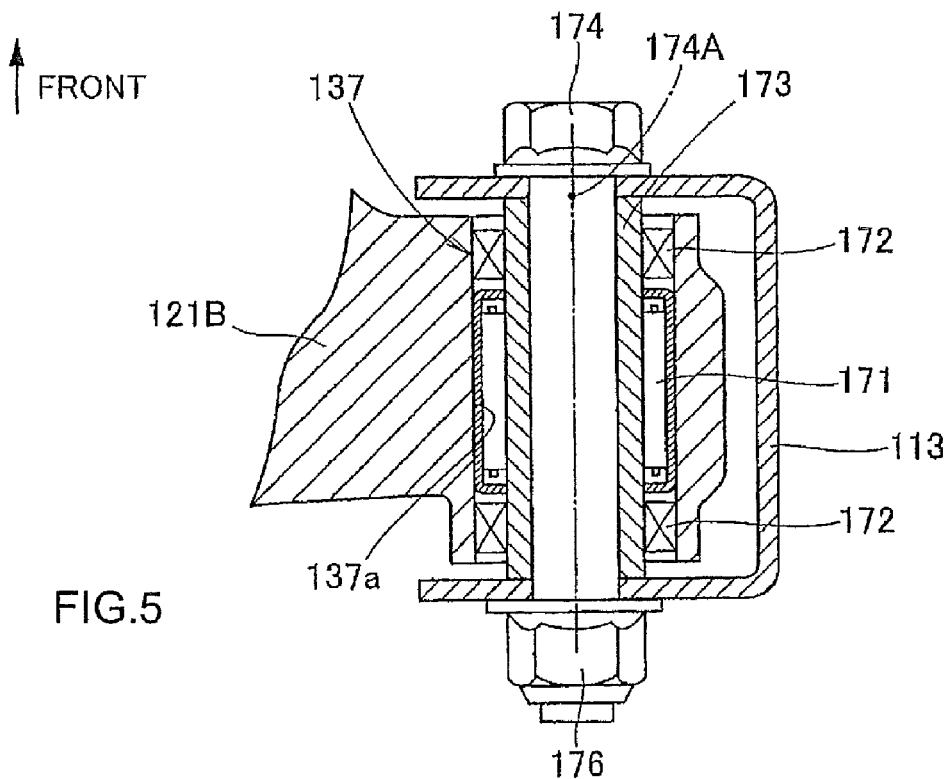
FIG. 5 is a second cross-sectional view showing the suspension arm supporting structure according to the embodiment of the present invention.

FIG. 5 is a second cross-sectional view showing a suspension arm supporting structure according to the embodiment of the present invention, illustrating the inner rear portion supporting member 137.

The inner rear portion supporting member 137 includes a needle bearing 171 and sealing members 172, 172 inserted into a through hole 137*a* formed in the inner rear arm portion 121B in the fore-and-aft direction, a cylindrical collar 173 inserted into the needle bearing 171 and the sealing members 172, 172, a screw bolt 174 passing through the rear suspension arm bracket 113, the collar 173 and the rear suspension arm bracket 113 in sequence and a nut 176 screwed onto the distal end of the screw bolt 174.

In the configuration as described above, the inner rear arm portion 121B is only supported by the needle bearing 171 of the inner rear portion supporting member 137 with respect to the rear suspension arm bracket 113 in the direction of radius (radial direction) of the needle bearing 171 and, for example, is not supported in the direction in which an axial line 174A of the screw bolt 174 extends, that is, in the axial direction of the screw bolt 174.

In this manner, by supporting the inner rear arm portion 121B only in the direction of radius, even when the distance between the inner front arm portion 121A and the inner rear arm portion 121B varies significantly within the manufacturing errors in FIG. 3, the inner rear arm portion 121B is displaced in the fore-and-aft direction with respect to a predetermined position when assembling the lower arm 121 to the rear suspension arm brackets 112, 113, so that the manufacturing errors described above are accommodated, and hence application of excessive force to the inner front arm portion 121A and the inner rear arm portion 121B is avoided.

Figure 6:
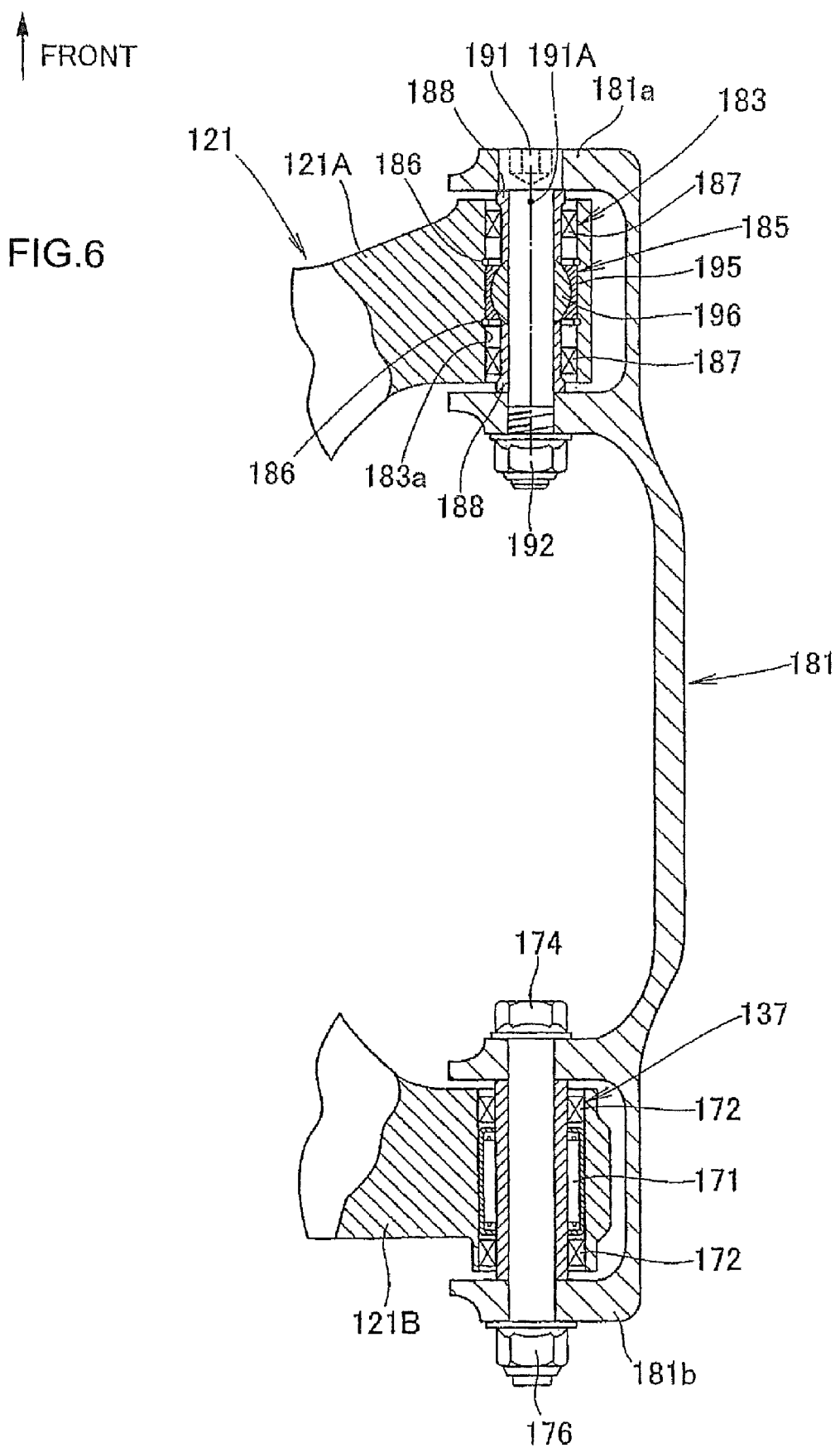
FIG. 6 is a cross-sectional view showing a suspension arm supporting structure according to another embodiment of the present invention.

FIG. 6 is a cross-sectional view showing a suspension arm supporting structure according to another embodiment of the present invention. The vehicle body frame is provided with a rear suspension arm bracket 181, and a front bracket portion 181*a* and a rear bracket portion 181*b* are provided at the front and back of the rear suspension arm bracket 181 respectively, and the lower arm 121 is supported by the front bracket portion 181*a* and the rear bracket portion 181*b* via an inner front portion supporting member 183 and the inner rear portion supporting member 137.

The inner front portion supporting member 183 includes a spherical slide bearing 185 inserted into a through hole 183*a* formed in the inner front arm portion 121A in the fore-and-aft direction, a pair of retaining rings 186, 186 attached to the inner peripheral surface of the through hole 183*a* for fixing the spherical slide bearing 185 in the through hole 183*a*, sealing members 187, 187 fitted to the both end portions of the through holes 183*a*, flanged sleeves 188, 188 inserted inside the seal members 187, 187 respectively and abutted at the distal ends thereof to the spherical slide bearing 185, a hexagon socket head cap screw 191 passing through the front bracket portion 181*a*, the flanged sleeve 188, the spherical slide bearing 185, the flanged sleeve 188 and the front bracket portion 181*a* in sequence, and a nut 192 screwed onto the distal end of the hexagon socket head cap screw 191.

The spherical slide bearing 185 includes an outer ring 195 to be fitted to the through hole 183*a* and an inner ring 196 having a concave spherical surface which slidably fits the convex spherical surface formed on the outer ring 195 and being fitted to the hexagon socket head cap screw 191.

In the configuration as described above, the inner front arm portion 121A is supported by the spherical slide bearing 185 of the inner front portion supporting member 183 with respect to the front bracket portion 181*a* in the direction of radius of the spherical slide bearing 185 and in the direction in which an axial line 191A of the cap screw 191 extends, that is, in the axial direction of the cap screw 191.

In this embodiment, as shown in FIG. 3, the inner front arm portion 121A is supported in the radial direction and the axial direction, and the inner rear arm portion 121B is supported only in the radial direction. However, the invention is not limited thereto, and a configuration in which the inner front arm portion 121A is supported only in the radial direction and the inner rear arm portion 121B is supported in the radial direction and the axial direction is also applicable.

In the embodiments of the present invention, the arm-side supporting portions and the arm portions of the suspension arm are formed integrally, and the one arm-side supporting portion is supported by the frame-side supporting portion in the radial direction and in the axial direction, and the other arm-side supporting portion is supported by the frame-side supporting portion only in the radial direction. Since the other arm-side supporting portion is supported by the frame-side supporting portion only in the radial direction, displacement of the arm-side supporting portion in the axial direction is allowed, and hence manufacturing errors of the frame-side supporting portions and the suspension arm are accommodated. Therefore, when the pair of arm-side supporting portions of the suspension arm are attached to the frame-side supporting portions, the manufacturing errors of the suspension arm are accommodated, so that assembly of the suspension arm is simplified.

In the embodiments of the present invention, the one arm-side supporting portion is supported by the needle bearing in the radial direction and by the bush in the axial direction. The effect is that the one arm-side supporting portion is supported by the needle bearing and the bush in the radial direction and in the axial direction, so that the position of the suspension arm is restricted. Therefore, the arm-side supporting portion is supported in the radial direction and in the axial direction, so that the position of the suspension arm is restricted.

In the embodiments of the present invention, the one arm-side supporting portion is supported by the spherical side bearing. The effect is that the one arm-side supporting portion is supported by the spherical slide bearing in the radial direction and in the axial direction. Therefore, the one arm-side supporting portion is supported in the radial direction and in the axial direction in the simple structure.

In the embodiments of the present invention, the bush receiving member for receiving the bush is provided inside the one arm-side supporting portion. Since the end surface of the one arm-side supporting portion closer to the other arm-side supporting portion, which receives the bush in the axial direction, cannot be machined, the separate bush receiving member is arranged on the one arm supporting portion, then the end surface which supports the bush in the axial direction is formed on the bush receiving member by machining and then the bush is arranged so as to abut to this end surface. Therefore, the bush is received by the bush receiving member in the axial direction, and the one arm-side supporting portion is supported by the bush in the axial direction.

In the embodiments of the present invention, the suspension arm is formed of aluminum alloy. The effect is that the suspension arm formed of aluminum alloy is light and hence the non-suspended mass is small. Therefore, the non-suspended mass is reduced, and hence the ride quality of the vehicle is improved.

The suspension arm supporting structure according to the embodiments of the present invention is suitable for four-wheel vehicles.

It is obvious that the present invention is not limited to the above-described embodiment, but can be applied to, for example, motorcycles or three-wheeled vehicles without limiting to the saddle-ride type four-wheeled vehicles, and various modifications can be made in a range without departing from the gist of the invention.

What is claimed as new and is desired to be secured by Letters Patent of the United States is:

1. A suspension arm supporting structure supported by a frame-side supporting portion of a vehicle body frame, comprising:
   a suspension arm including first and second arm-side supporting portions, an outer front arm portion provided on a front portion of an outer side of the vehicle body, an outer rear arm portion provided on a rear portion on the outer side of the vehicle body, and an arm portion which are integrally formed, the first arm-side supporting portion being supported by the frame-side supporting portion in a radial direction and in an axial direction, the second arm-side supporting portion being supported by the frame-side supporting portion only in the radial direction, the outer front arm portion and the outer rear arm portion each including a separate hole configured to receive a bolt therein for supporting a knuckle connected to a wheel,
   wherein the first arm-side supporting portion is supported by a needle bearing in the radial direction and is supported by a bush in the axial direction,
   wherein the first arm-side supporting portion includes a through hole and a bush receiving member fitted within a first end of the through hole, and
   wherein the bush receiving member is configured to receive the bush in the axial direction, the bush having a first portion that is fitted within a hole of the bush receiving member, and the bush having a second portion that extends axially beyond the bush receiving member.

2. The suspension arm supporting structure according to claim 1, wherein the second arm-side supporting portion is supported by a needle bearing in the radial direction.

3. The suspension arm supporting structure according to claim 1, wherein the suspension arm is formed of aluminum alloy.

4. The suspension arm supporting structure according to claim 1, wherein the second portion of the bush abuts an axial end of the bush receiving member.

5. The suspension arm supporting structure according to claim 1, wherein the first arm-side supporting portion further includes an additional bush fitted within a second end of the through hole.

6. The suspension arm supporting structure according to claim 5, wherein the needle bearing is positioned sandwiched between the bush receiving member and the additional bush.

7. The suspension arm supporting structure according to claim 6, wherein the needle bearing is spaced axially apart from the bush, the bush receiving member, and the additional bush.

8. The suspension arm supporting structure according to claim 7, wherein the second arm-side supporting portion is supported by a needle bearing in the radial direction.

9. The suspension arm supporting structure according to claim 8, wherein the second portion of the bush abuts an axial end of the bush receiving member.

10. The suspension arm supporting structure according to claim 1, wherein the suspension arm include an arm body having a plurality of weight reducing holes extending therethrough.

* * * * *